(12) United States Patent
Stavrou et al.

(10) Patent No.: US 9,811,341 B2
(45) Date of Patent: Nov. 7, 2017

(54) MANAGED INSTRUCTION CACHE PREFETCHING

(75) Inventors: Kyriakos A. Stavrou, Barcelona (ES); Enric Gibert Codina, Barcelona (ES); Josep M. Codina, Hospitalet de Llobregat (ES); Crispin Gomez Requena, Valencia (ES); Antonio Gonzalez, Barcelona (ES); Mirem Hyuseinova, Barcelona (ES); Christos E. Kotselidis, Linz (AT); Fernando Latorre, Barcelona (ES); Pedro Lopez, Molins de Rei (ES); Marc Lupon, Barcelona (ES); Carlos Madriles Gimeno, Barcelona (ES); Grigorios Magklis, Barcelona (ES); Pedro Marcuello, Barcelona (ES); Alejandro Martinez Vicente, Barcelona (ES); Raul Martinez, Barcelona (ES); Daniel Ortega, Barcelona (ES); Demos Pavlou, Barcelona (ES); Georgios Tournavitis, Barcelona (ES); Polychronis Xekalakis, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 13/995,649

(22) PCT Filed: Dec. 29, 2011

(86) PCT No.: PCT/US2011/067964
§ 371 (c)(1),
(2), (4) Date: Jun. 19, 2013

(87) PCT Pub. No.: WO2013/101121
PCT Pub. Date: Jul. 4, 2013

(65) Prior Publication Data
US 2014/0019721 A1    Jan. 16, 2014

(51) Int. Cl.
*G06F 9/38*    (2006.01)
*G06F 9/30*    (2006.01)
*G06F 12/0862*    (2016.01)

(52) U.S. Cl.
CPC .......... *G06F 9/3804* (2013.01); *G06F 9/3017* (2013.01); *G06F 9/30047* (2013.01);
(Continued)

(58) Field of Classification Search
CPC .. G06F 9/3804; G06F 9/3802; G06F 9/30047; G06F 9/3806; G06F 9/3848
See application file for complete search history.

(56) References Cited

U.S. PATENT DOCUMENTS 5,367,703 A    11/1994  Levitan
5,704,053 A *  12/1997  Santhanam ........... G06F 8/4442
                                                712/E9.047
(Continued)

FOREIGN PATENT DOCUMENTS

TW    200816046 A    4/2008
TW    200821924 A    5/2008
WO    WO 9803908 A1 *  1/1998    ........... G06F 9/3846

OTHER PUBLICATIONS

European Patent Office search opinion and search report, EP 110878987, dated Jun. 17, 2015, 4 pages.*

(Continued)

*Primary Examiner* — Yuqing Xiao
(74) *Attorney, Agent, or Firm* — Nicholson De Vos Webster & Elliott LLP (57) ABSTRACT

Disclosed is an apparatus and method to manage instruction cache prefetching from an instruction cache. A processor may comprise: a prefetch engine; a branch prediction engine to predict the outcome of a branch; and dynamic optimizer. The dynamic optimizer may be used to control: identifying (Continued)

common instruction cache misses and inserting a prefetch instruction from the prefetch engine to the instruction cache.

5 Claims, 4 Drawing Sheets

(52) U.S. Cl.
CPC .......... *G06F 9/3802* (2013.01); *G06F 9/3806* (2013.01); *G06F 9/3848* (2013.01); *G06F 12/0862* (2013.01); *G06F 2212/452* (2013.01)

(56) References Cited

U.S. PATENT DOCUMENTS

| | | | | |
|---|---|---|---|---|
| 5,742,804 A * | 4/1998 | Yeh | G06F 9/3804 | 712/207 |
| 5,822,790 A * | 10/1998 | Mehrotra | G06F 9/3802 | 326/11 |
| 6,029,228 A * | 2/2000 | Cai | G06F 9/30174 | 711/137 |
| 6,055,621 A * | 4/2000 | Puzak | G06F 9/3802 | 712/207 |
| 6,167,506 A * | 12/2000 | Witt | G06F 9/30021 | 711/213 |
| 6,308,322 B1 * | 10/2001 | Serocki | G06F 8/4451 | 712/240 |
| 6,401,192 B1 * | 6/2002 | Schroter | G06F 9/383 | 711/137 |
| 6,560,693 B1 * | 5/2003 | Puzak | G06F 9/383 | 712/205 |
| 6,799,263 B1 * | 9/2004 | Morris | G06F 9/3802 | 711/119 |
| 7,032,097 B2 | 4/2006 | Alexander et al. | | |
| 7,177,985 B1 * | 2/2007 | Diefendorff | G06F 12/0862 | 711/118 |
| 7,457,923 B1 * | 11/2008 | Chou | G06F 12/0862 | 711/137 |
| 8,060,701 B2 | 11/2011 | Morrow et al. | | |
| 8,135,915 B2 | 3/2012 | Dimpsey et al. | | |
| 8,146,064 B2 * | 3/2012 | Chen | G06F 12/0837 | 711/113 |
| 8,533,422 B2 * | 9/2013 | Subramaniam | G06F 9/3816 | 711/105 |
| 2001/0032297 A1 * | 10/2001 | Morikawa | G06F 12/0846 | 711/133 |
| 2002/0095566 A1 * | 7/2002 | Sharangpani | G06F 9/325 | 712/239 |
| 2003/0131199 A1 * | 7/2003 | Liptay | G06F 9/30047 | 711/137 |
| 2003/0145314 A1 * | 7/2003 | Nguyen | G06F 8/4442 | 717/158 |
| 2003/0225996 A1 * | 12/2003 | Thompson | G06F 8/4442 | 712/207 |
| 2004/0215921 A1 | 10/2004 | Alexander et al. | | |
| 2005/0154859 A1 * | 7/2005 | Gilkerson | G06F 9/30054 | 712/207 |
| 2006/0026408 A1 * | 2/2006 | Morris | G06F 9/3848 | 712/239 |
| 2006/0174090 A1 * | 8/2006 | Sartorius | G06F 9/3804 | 712/207 |
| 2006/0212680 A1 * | 9/2006 | Yasue | G06F 9/30047 | 712/207 |
| 2006/0253686 A1 * | 11/2006 | Suzuki | G06F 9/3806 | 712/207 |
| 2007/0150660 A1 * | 6/2007 | Marathe | G06F 12/0862 | 711/137 |
| 2007/0234311 A1 * | 10/2007 | Plummer | G06F 9/443 | 717/136 |
| 2007/0239940 A1 * | 10/2007 | Doshi | G06F 12/0862 | 711/137 |
| 2008/0046702 A1 * | 2/2008 | Morrow | G06F 9/3804 | 712/238 |
| 2008/0059780 A1 * | 3/2008 | Stempel | G06F 9/30058 | 712/242 |
| 2009/0287903 A1 * | 11/2009 | Hsu | G06F 8/4442 | 711/213 |
| 2010/0095271 A1 * | 4/2010 | Archambault | G06F 8/4442 | 717/110 |
| 2010/0306515 A1 * | 12/2010 | Al-Otoom | G06F 9/3848 | 712/240 |
| 2012/0042155 A1 * | 2/2012 | Rychlik | G06F 9/3806 | 712/238 |
| 2012/0066455 A1 * | 3/2012 | Punyamurtula | G06F 12/0862 | 711/122 |
| 2013/0013867 A1 * | 1/2013 | Manne | G06F 12/0862 | 711/137 |

OTHER PUBLICATIONS

Zhang et al., "Execution History Guided Instruction Prefetching," Jun. 2002, ICS '02 Proceedings of the 16th international conference on Supercomputing, pp. 199-208.*
Srinivasan et al., "Branch history guided instruction prefetching," Jan. 2001, The Seventh International Symposium on High-Performance Computer Architecture, pp. 291-300.*
Hsu et al., "A Performance Study of Instruction Cache Prefetching Methods," May 1998, IEEE Transactions on Computers vol. 47, Issue 5, pp. 497-508.*
PCT International Search Report for PCT Counterpart Application No. PCT/US2011/067964, 3 pgs., (dated Jun. 8, 2012).
PCT Written Opinion of the International Searching Authority for PCT Counterpart Application No. PCT/US2011/067964, 5 pgs., (dated Jun. 8, 2012).
PCT Notification concerning Transmittal of International Preliminary Report on Patentability (Chapter I of the Patent Cooperation Treaty) for PCT Counterpart Application No. PCT/US2011/067964, 7 pgs., (dated Jul. 10, 2014).
Office action with summarized English translation from Taiwan Patent Application No. 101148746, dated May 18, 2015, 16 pages.
Decision on Rejection with summarized English translation from Taiwan Patent Application No. 101148746 dated Feb. 25, 2016, 11 pages.

* cited by examiner

MANAGED INSTRUCTION CACHE PREFETCHING

CROSS-REFERENCE TO RELATED APPLICATION

This patent application is a U.S. National Phase Application under 35 U.S.C. §371 of International Application No. PCT/US2011/067964, filed Dec. 29, 2011, entitled MANAGED INSTRUCTION CACHE PREFETCHING.

BACKGROUND

Field of the Invention

Embodiments of the invention generally relate to a method and apparatus for managed instruction cache prefetching.

Description of the Related Art

The instruction cache is one of the principle components of modern day microprocessors. The instruction cache's primary responsibility is to provide the instruction stream to the processor pipeline. Although, in many cases, stalls caused by instruction cache misses do not to have a major impact on performance, there are many cases for which instruction cache misses do have a major impact on performance. Examples of these types of cases that are well-known to have poor instruction cache behavior that negatively affect performance are server workloads and hardware/software co-design virtual machines.

To decrease performance loss due to the instruction cache misses, processors may use larger caches (and/or caches of higher associativity) and/or hardware prefetchers. Hardware prefetchers may be used to predict the instruction stream and issue prefetch requests for future instructions. However, there are scenarios that the hardware prefetchers are by construction unable to correctly predict the future stream.

Typically, the hardware prefetcher prefetches the addresses for instructions predicted by a branch prediction engine. This branch prediction engine predicts the future instructions that are to be executed based upon branch predictions. Because the prefetcher is tightly dependent on the branch prediction engine, the prefetcher often fails to issue the proper prefetch requests whenever the branch prediction engine fails to correctly predict the target of a branch. Therefore, improved instruction cache prefetching techniques are sought after.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

The following are exemplary computer systems that may be utilized with embodiments of the invention to be hereinafter discussed and for executing instruction(s) detailed herein. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 1:
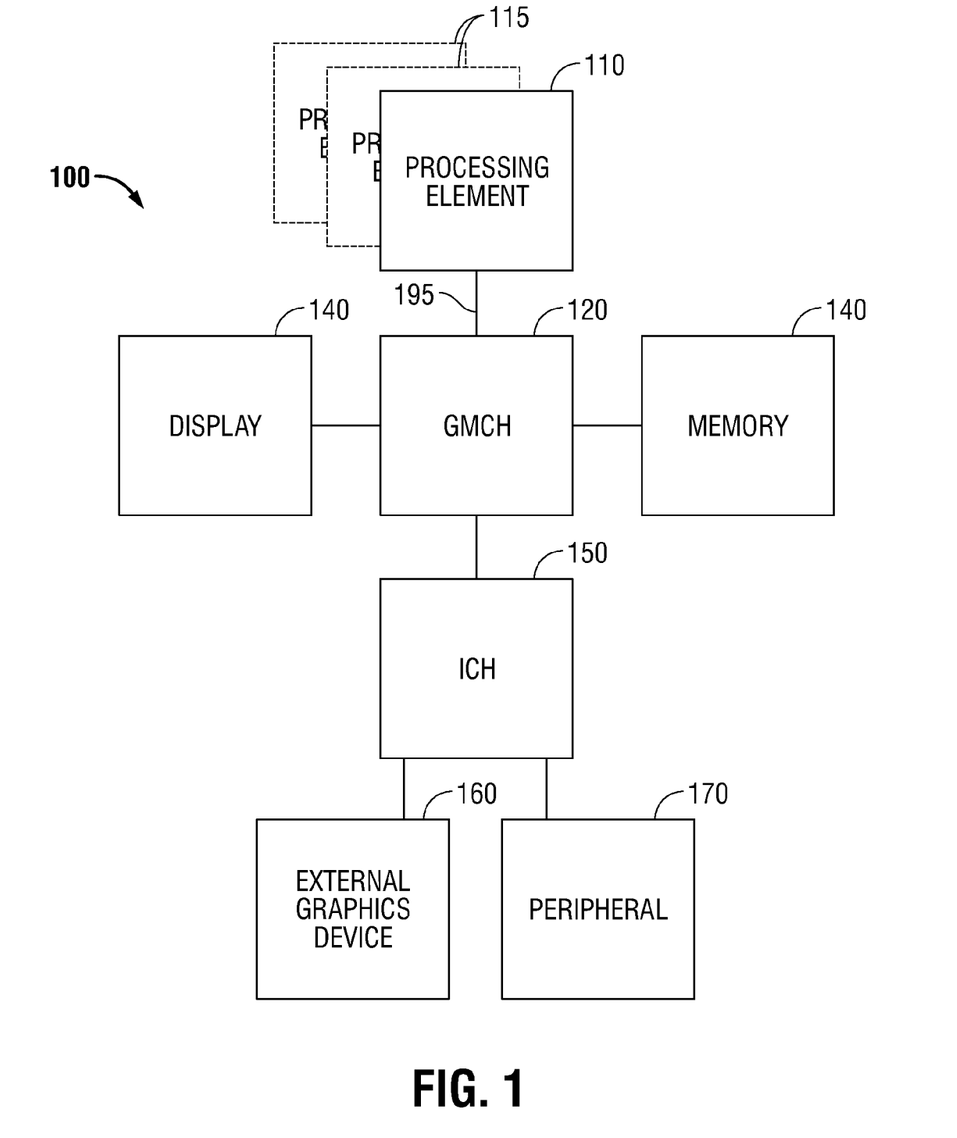
FIG. 1 illustrates a computer system architecture that may be utilized with embodiments of the invention.

Referring now to FIG. 1, shown is a block diagram of a computer system 100 in accordance with one embodiment of the present invention. The system 100 may include one or more processing elements 110, 115, which are coupled to graphics memory controller hub (GMCH) 120. The optional nature of additional processing elements 115 is denoted in FIG. 1 with broken lines. Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multithreaded in that they may include more than one hardware thread context per core.

FIG. 1 illustrates that the GMCH 120 may be coupled to a memory 140 that may be, for example, a dynamic random access memory (DRAM). The DRAM may, for at least one embodiment, be associated with a non-volatile cache. The GMCH 120 may be a chipset, or a portion of a chipset. The GMCH 120 may communicate with the processor(s) 110, 115 and control interaction between the processor(s) 110, 115 and memory 140. The GMCH 120 may also act as an accelerated bus interface between the processor(s) 110, 115 and other elements of the system 100. For at least one embodiment, the GMCH 120 communicates with the processor(s) 110, 115 via a multi-drop bus, such as a frontside bus (FSB) 195. Furthermore, GMCH 120 is coupled to a display 140 (such as a flat panel display). GMCH 120 may include an integrated graphics accelerator. GMCH 120 is further coupled to an input/output (I/O) controller hub (ICH) 150, which may be used to couple various peripheral devices to system 100. Shown for example in the embodiment of FIG. 1 is an external graphics device 160, which may be a discrete graphics device coupled to ICH 150, along with another peripheral device 170.

Alternatively, additional or different processing elements may also be present in the system 100. For example, additional processing element(s) 115 may include additional processors(s) that are the same as processor 110, additional processor(s) that are heterogeneous or asymmetric to processor 110, accelerators (such as, e.g., graphics accelerators or digital signal processing (DSP) units), field programmable gate arrays, or any other processing element. There can be a variety of differences between the physical resources 110, 115 in terms of a spectrum of metrics of merit including architectural, microarchitectural, thermal, power consumption characteristics, and the like. These differences may effectively manifest themselves as asymmetry and heterogeneity amongst the processing elements 110, 115. For at least one embodiment, the various processing elements 110, 115 may reside in the same die package.

Figure 2:
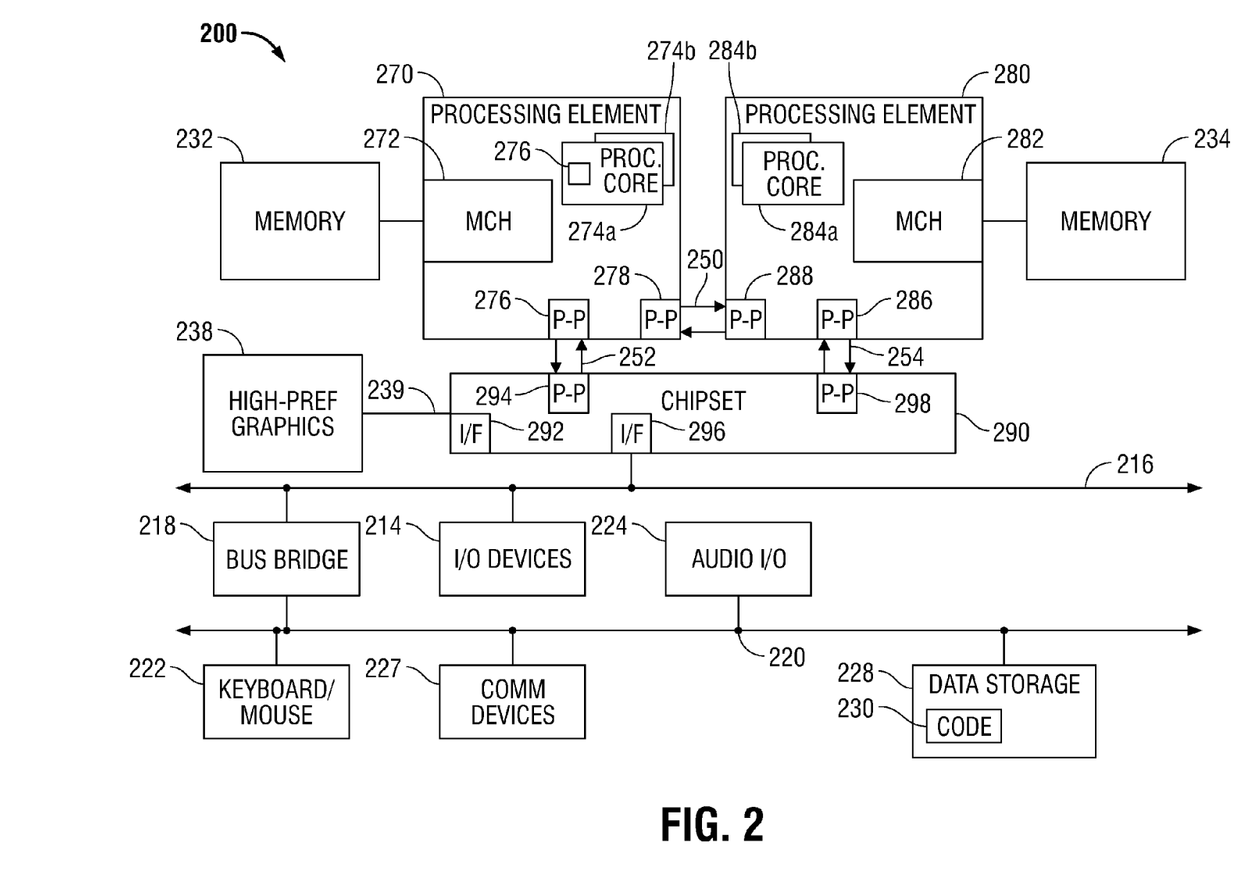
FIG. 2 illustrates a computer system architecture that may be utilized with embodiments of invention.

Referring now to FIG. 2, shown is a block diagram of another computer system 200 in accordance with an embodiment of the present invention. As shown in FIG. 2, multi-processor system 200 is a point-to-point interconnect system, and includes a first processing element 270 and a second processing element 280 coupled via a point-to-point interconnect 250. As shown in FIG. 2, each of processing elements 270 and 280 may be multicore processors, including first and second processor cores (i.e., processor cores 274a and 274b and processor cores 284a and 284b). Alternatively, one or more of processing elements 270, 280 may be an element other than a processor, such as an accelerator or a field programmable gate array. While shown with only two processing elements 270, 280, it is to be understood that the scope of the present invention is not so limited. In other embodiments, one or more additional processing elements may be present in a given processor.

First processing element 270 may further include a memory controller hub (MCH) 272 and point-to-point (P-P) interfaces 276 and 278. Similarly, second processing element 280 may include a MCH 282 and P-P interfaces 286 and 288. Processors 270, 280 may exchange data via a point-to-point (PtP) interface 250 using PtP interface circuits 278, 288. As shown in FIG. 2, MCH's 272 and 282 couple the processors to respective memories, namely a memory 242 and a memory 244, which may be portions of main memory locally attached to the respective processors.

Processors 270, 280 may each exchange data with a chipset 290 via individual PtP interfaces 252, 254 using point to point interface circuits 276, 294, 286, 298. Chipset 290 may also exchange data with a high-performance graphics circuit 238 via a high-performance graphics interface 239. Embodiments of the invention may be located within any processing element having any number of processing cores. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. First processing element 270 and second processing element 280 may be coupled to a chipset 290 via P-P interconnects 276, 286 and 284, respectively. As shown in FIG. 2, chipset 290 includes P-P interfaces 294 and 298. Furthermore, chipset 290 includes an interface 292 to couple chipset 290 with a high performance graphics engine 248. In one embodiment, bus 249 may be used to couple graphics engine 248 to chipset 290. Alternately, a point-to-point interconnect 249 may couple these components. In turn, chipset 290 may be coupled to a first bus 216 via an interface 296. In one embodiment, first bus 216 may be a Peripheral Component Interconnect (PCI) bus, or a bus such as a PCI Express bus or another third generation I/O interconnect bus, although the scope of the present invention is not so limited.

As shown in FIG. 2, various I/O devices 214 may be coupled to first bus 216, along with a bus bridge 218 which couples first bus 216 to a second bus 220. In one embodiment, second bus 220 may be a low pin count (LPC) bus. Various devices may be coupled to second bus 220 including, for example, a keyboard/mouse 222, communication devices 226 and a data storage unit 228 such as a disk drive or other mass storage device which may include code 230, in one embodiment. Further, an audio I/O 224 may be coupled to second bus 220. Note that other architectures are possible. For example, instead of the point-to-point architecture of, a system may implement a multi-drop bus or other such architecture.

In one embodiment, aspects of the invention rely on a new instruction and its usage. This instruction may be called "pref_i" and its operation is to issue a prefetch request for a specific address into the Instruction Cache. Beneficial elements of this instruction include: The way the address of the line to be prefetched is identified; and the conditions under which the prefetch request is executed or ignored Turning now to FIG. 3, a block diagram of a processor core 300 including a dynamic optimizer 310 that enables managed instruction cache prefetching is illustrated, according to one embodiment of the invention. It should be appreciated that processor core 300 may be one of the many different processor cores 274 and 284 of computer system 200, previously described. Dynamic optimizer 310 may review a prefetching algorithm 312 and a table 314. Dynamic optimizer 310 implementing prefetching algorithm 312 may operate in conjunction with the inner core 320 of processor core 300 to enable managed instruction cache prefetching, as will be described in detail hereinafter.

Figure 3:
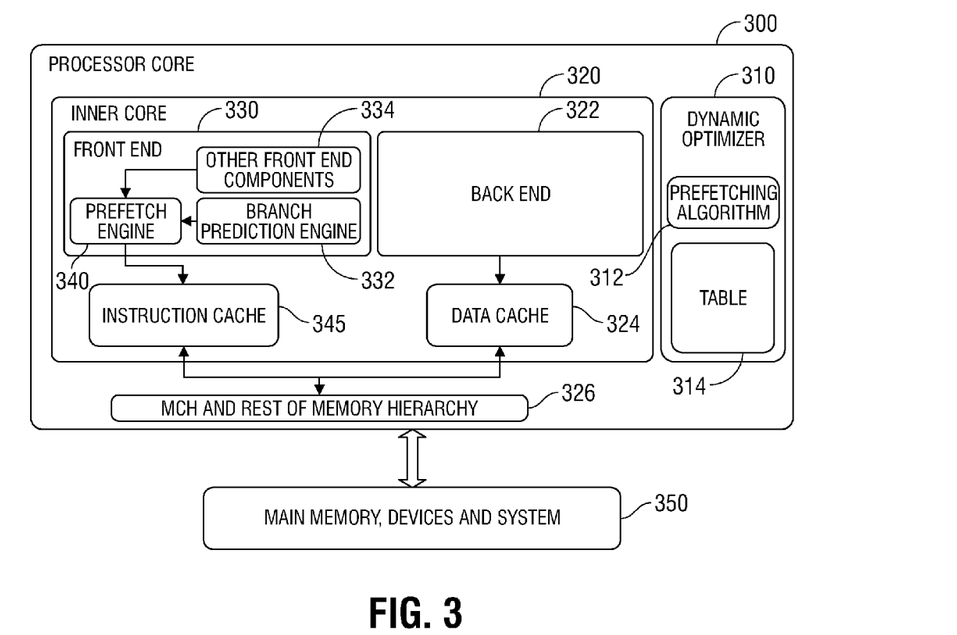
FIG. 3 is a block diagram of processor core including a dynamic optimizer that enables instruction cache prefetching, according to one embodiment of the invention.

Inner core 320 may include a back end 322 coupled to a data cache 324 and a front end 330 coupled to an instruction cache 345. The instruction cache 345 and data cache 324 are coupled to the MCH and the rest of the memory hierarchy 326 (as previously described with reference to FIGS. 1 and 2), which is in turn coupled to the main memory, devices, and system components 350 (as previously described with reference to FIGS. 1 and 2). Front end 330 may include a branch prediction engine or unit 332, as well as other front end components 334, which are coupled to prefetch engine 340, which in turn, is coupled to instruction cache 345.

As is known, the instruction cache (IC) 345 is utilized to provide the instruction stream to the processor. The prefetch engine 340 may predict the instruction stream and issue prefetch requests for future instructions from the IC 345 based upon address predictions from the branch prediction engine 332. Unfortunately, the branch prediction engine 332 often makes wrong predictions.

Embodiments of the invention relate to dynamic optimizer 310 that utilizes a prefetching algorithm 312 and a table 314 to provide a method and process to accurately manage instruction cache prefetching by the prefetch engine 340 to the IC 345. In one embodiment, a new instruction controlled by dynamic optimizer 310 and prefetching algorithm 312 is always utilized that is entitled prefetch instruction (hereinafter pref_i) that issues a prefetch request for a specific address into the IC 345. Aspects of the invention relate to how the address of the line to be prefetched is identified and the conditions under which the prefetch request is executed or ignored.

In one embodiment, the dynamic optimizer 310 implementing prefetching algorithm 312 and table 314 may be a hardware and software combination. For example, dynamic optimizer 310 may incorporate binary translator software that monitors IC 345 misses and collects dynamic profiling information that it incorporates into table 314. However, it should be appreciated that dynamic optimizer 310 may be implemented in hardware, software, firmware, or a combination thereof, to incorporate the techniques of accurately managing instruction cache prefetching by prefetch engine 340 to the IC 345, as will be hereinafter described. Also, an offline compiler may also collect information during an execution done for profiling purpose (e.g., profile-guide optimizations).

Figure 4:
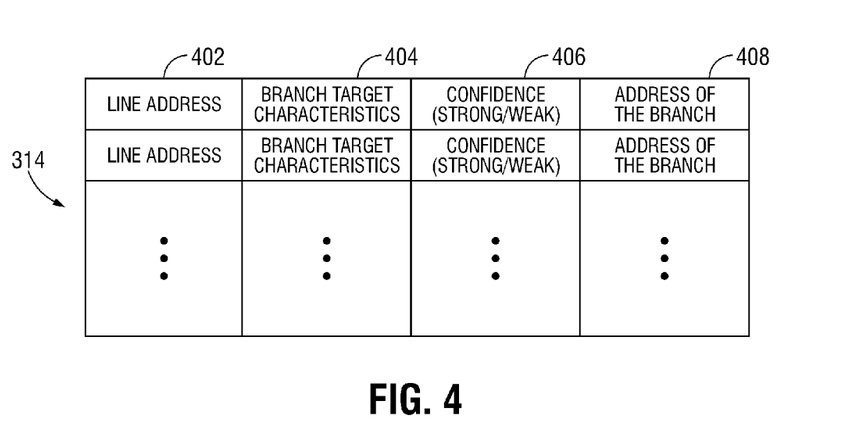
FIG. 4 shows a table to store profiled dynamic information, according to one embodiment of the invention.

With additional brief reference FIG. 4, table 314 stores profiled dynamic information that includes the IC addresses that miss often and cause perceived stalls to the processor pipeline. As an example, this information stored in table 314 may include: the line address 402 of the request missed; the branch target characteristics 404 for the request that missed (i.e., if the code request missed was due to a direct or an indirect branch); the confidence (strong/weak) 406 with which the branch prediction unit 332 predicted the corresponding branch for the case of direct branches; and the address of the branch that led to requesting this line 408. As shown in FIG. 4, table 314 may include many entries related to profiled dynamic information. Dynamic optimizer 310 may access table 314 to insert prefetch requests according to prefetching algorithm 312, as will be hereinafter described in detail.

Returning briefly to FIG. 3, as an overview, the processor core 300 may include: a prefetch engine 340; a branch prediction engine 332 to predict the outcome of a branch; and a dynamic optimizer 310. In particular, the branch prediction engine 332 may predict the outcome of direct conditional branches and the target of indirect branches. The dynamic optimizer 310 may control: identifying common instruction cache misses and inserting a prefetch instruction from the prefetch engine 340 to the instruction cache 345. It should be noted that it is the instruction cache 345 itself that determines if an instruction cache miss occurred. The dynamic optimizer 310 only uses this information to determine accesses that miss often. If an instruction cache miss occurred, the dynamic optimizer 310 may control inserting a prefetch instruction from the prefetch engine 340 to the instruction cache 345, as will be described in more detail later.

The dynamic optimizer 310 may utilize information from the branch prediction engine 332 as to whether a taken branch has a strong or weak prediction and the prefetch instruction inserted from the prefetch engine 340 may be based upon whether the taken branch had a strong prediction or a weak prediction. Further, dynamic optimizer 310 may utilize information from the branch prediction engine 332 as to whether a not taken branch has a strong or weak prediction and the prefetch instruction inserted from the prefetch engine 340 may be based upon whether the not taken branch had a strong prediction or a weak prediction. In particular, the prefetch instruction is inserted regardless of the prediction (strong or weak) as the confidence of the instruction (strong or weak) defines if the instruction will at the end be executed or not. However, as will be described, this applies only for the pref_i.P version of the instruction. The pref_i is always executed whereas the pref_i.P is predicated on the prediction confidence (ignored if strong, executed if weak). Example of these types of operations will be discussed in detail with reference to FIG. 5, as follows.

Figure 5:
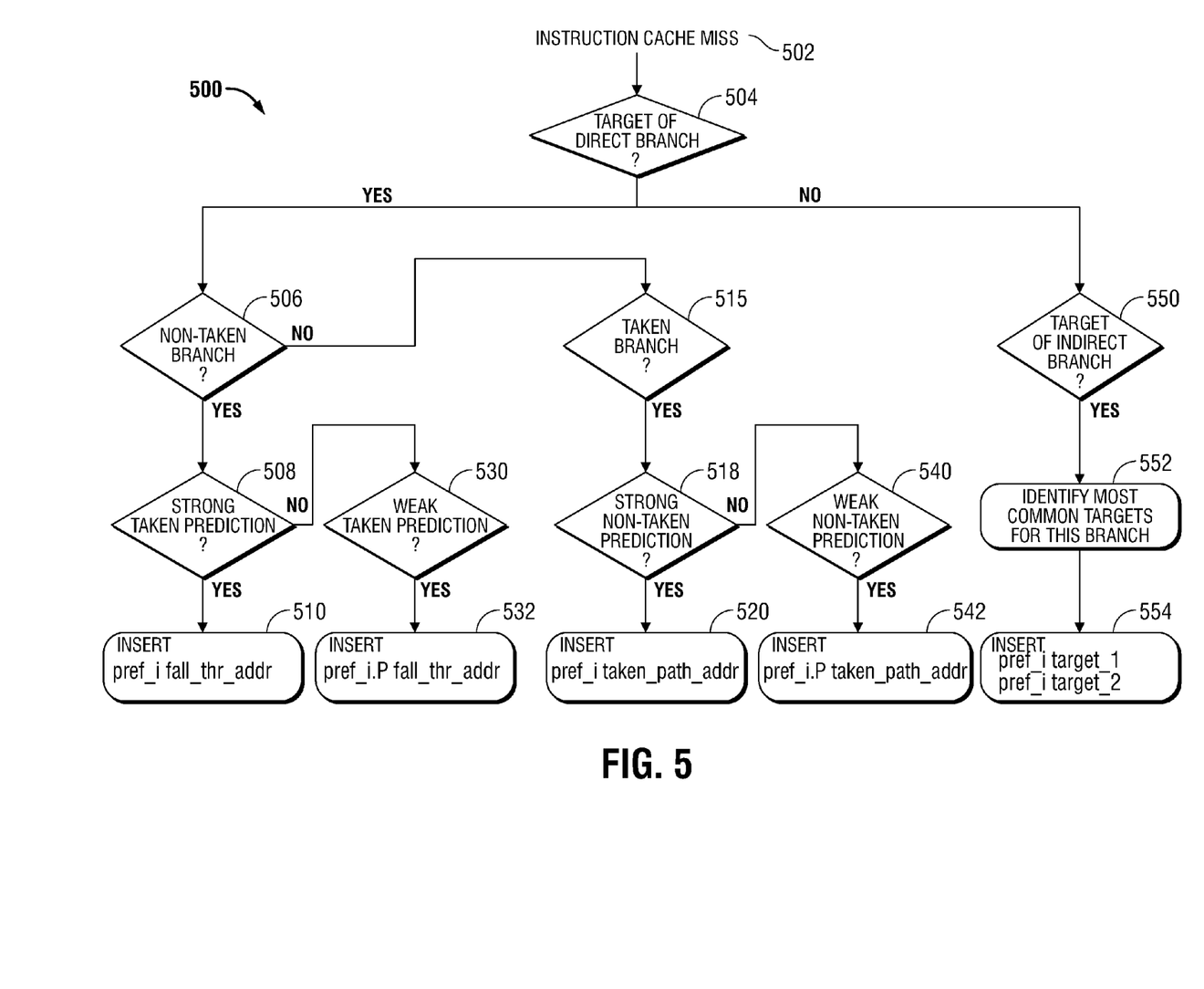
FIG. 5 is a flow diagram of a process to implement a prefetching algorithm of the dynamic optimizer to insert prefetch requests, according to one embodiment of the invention.

With reference now to FIG. 5, FIG. 5 is a flow diagram of a process 500 to implement the prefetching algorithm 312 of dynamic optimizer 310 to insert prefetch requests, according to embodiments of the invention. First, an instruction cache miss occurs 502. In particular, this process 500 may be performed for accesses that miss often. As an example, during program execution, the processor gathers profiling information. Then the dynamic optimizer 310 consults this dynamic information and executes process 500. Next, at decision block 504, process 500 determines whether the target was for a direct branch or an indirect branch. Various prefetch insertions of prefetch instructions (pref_i) will be hereinafter described.

IC-Miss after a Non-Taken Branch/Strong-Taken Prediction

If it is determined that an instruction cache (IC) 345 miss has occurred, and process 500 at decision block 506 determines that it is a non-taken branch and further determines at decision block 508 that branch prediction engine 332 indicated a strong taken path prediction, then prefetching algorithm 312 of dynamic optimizer 310 considers this address as a fall-through path of the loop that saturated the branch prediction engine. The prefetching algorithm 312 causes the insertion of a prefetching instruction (pref_i) in the body of the loop such that the request is issued at the last iterations of the loop. In particular, a prefetch fall-through address instruction (pref_i_fall_through_address) is converted by the front end 330 in a prefetch request for the fall-through address of the branch such that the instruction that is inserted by the prefetch engine 340 is: pref_i_fall_through_address (block 510).

IC-Miss after a Taken Branch/Strong-Non-Taken Prediction

If it is determined that an instruction cache (IC) 345 miss has occurred, and process 500 at decision block 506 determines that it is not a non-taken branch but is determined to be a taken branch (decision block 515) and further determines at decision block 518 that branch prediction engine 332 indicated a strong non-taken prediction (decision block 518), then prefetching algorithm 312 of dynamic optimizer 310 considers the branch prediction engine 332 inefficient for predicting this branch. Accordingly, prefetching algorithm 312 causes the insertion of prefetching instruction (pref_i) that prefetches the address at the taken-path of the branch. In particular, the front end 330 converts this instruction to a prefetch request for the address at the taken-path of the branch. In this case, the instruction that is inserted by the prefetch engine 340 is a prefetch request for the address at the taken-path of the branch (pref_i_taken_path_addr) (block 520).

IC-Miss after a Non-Taken Branch/Weak-Taken Prediction

If it is determined that an instruction cache (IC) 345 miss has occurred, and process 500 at decision block 506 determines that it is a non-taken branch and further determines at decision block 508 that branch prediction engine 332 did not indicate that it was strong taken prediction and instead at decision block 530 it is determined to be a weak taken prediction, then prefetching algorithm 312 of dynamic optimizer 310 considers this address to be a target of a non-biased branch. Based on this, the prefetching algorithm 312 inserts a predicated prefetch instruction (pref_i.P) for the fall-through address. Whenever this predicated pref_i instruction (pref_i.P) passes from the front end 330, it is either:

A) Ignored if the branch prediction unit 332 provided a strong prediction for the branch—the rationale being that the branch prediction unit 332 had high confidence that the prefetch request could lead to instruction cache pollution with non-negligible possibility. It should be noted that the confidence of the branch prediction unit for a specific branch can change during the execution of the application; or B) If the branch prediction unit 332 provided a weak prediction for the branch—the pref_i.P instruction is converted to an instruction cache prefetch request for the fall-through address. Thus, the instruction that is inserted by the prefetch engine 340 is the pref_i.P fall_thr_addr (block 532).

It should be noted that the .P flag of the pref_i instruction denotes that it is predicated, i.e. that the front end 330 should ignore it if the branch prediction unit 332 predicted the corresponding branch with high confidence. In this case, the pref_i.P instruction is to be considered as a version of the pref_ i instruction.

IC-Miss after a Taken Branch/Weak-Non-Taken Prediction

If it is determined that an instruction cache (IC) 345 miss has occurred, and process 500 at decision block 506 determines that it is not a non-taken branch but is determined to be a taken branch (decision block 515) and further determines at decision block 518 that branch prediction engine 332 did not indicate a strong non-taken prediction (decision block 518) but instead a weak non-taken branch, then prefetching algorithm 312 of dynamic optimizer 310 consider this to be the same algorithm as the "IC-miss after a Non-Taken Branch/Weak-Taken Prediction", but instead of the fall-through address, it prefetches the taken-path address. Thus, in this case, the instruction that is inserted by the prefetch engine 340 is a predicated prefetch instruction for the taken path address (pref_i.P taken_path_addr) (block 542).

IC-Miss after an Indirect Branch

If it is determined that an instruction cache (IC) 345 miss has occurred, process 500 at decision block 504 determines that the target was sought not by a direct branch but by an indirect branch (decision block 550), then the prefetching algorithm 312 of dynamic optimizer 310 considers the indirect branch predictor inefficient for predicting the next address. To prevent the misprediction, prefetching algorithm 312 checks its target table 314 for this branch and defines the most common target addresses (block 552). The prefetching algorithm 312 inserts pref_ i instructions for the most common targets. In this case, the instructions that are inserted by the prefetch engine 340 may include instructions such as: pref_i target1, pref_i target2, etc. (block 554).

It should be noted that for all cases the pref_i instruction is inserted by the prefetching algorithm 312 of dynamic optimizer 310 through the prefetch engine 340 before the instruction that causes the miss. Further, it should be noted that embodiments of the invention resolve high miss rate problems by triggered prefetching in the instruction cache 345. In particular, the dynamic optimizer 310 utilizing prefetching algorithm 312 by observing the application execution predicts whether an access will lead to a miss and evaluates the impact. If the cost is predicted to be high (for example when an instruction cache 345 miss follows a mispredicted branch), the dynamic optimizer 310 causes the insertion of special prefetch instructions (pref_i) that prefetches this instruction in the instruction cache 345 converting the miss into a hit.

Embodiments of the mechanisms disclosed herein may be implemented in hardware, software, firmware, or a combination of such implementation approaches. Embodiments of the invention may be implemented as computer programs or program code executing on programmable systems comprising at least one processor, a data storage system (including volatile and non-volatile memory and/or storage elements), at least one input device, and at least one output device.

Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Such machine-readable storage media may include, without limitation, non-transitory, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions for performing the operations embodiments of the invention or containing design data, such as HDL, which defines structures, circuits, apparatuses, processors and/or system features described herein. Such embodiments may also be referred to as program products.

Certain operations of the instruction(s) disclosed herein may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of FIGS. 1 and 2 and embodiments of the instruction(s) may be stored in program code to be executed in the systems. Additionally, the processing elements of these figures may utilize one of the detailed pipelines and/or architectures (e.g., the in-order and out-of-order architectures) detailed herein. For example, the decode unit of the in-order architecture may decode the instruction(s), pass the decoded instruction to a vector or scalar unit, etc.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method to manage instruction cache prefetching from an instruction cache comprising:
    storing information about instruction cache misses, wherein the information includes an instruction cache line address, branch target characteristics including a type of branch indicator, the confidence of the prediction, and a branch address;
    identifying common instruction cache misses; predicting the outcome of a branch and providing a confidence of the prediction;
    for an indirect branch, inserting, regardless of the confidence, a prefetch instruction from a prefetch engine to the instruction cache; and
    for a direct branch, inserting the prefetch instruction from the prefetch engine to the instruction cache is based upon whether the taken branch had a strong prediction or a weak prediction and the prefetch instruction is executed or not executed dependent upon the confidence of the prediction.

2. A processor to manage instruction cache prefetching from an instruction cache comprising:
    a prefetch engine;
    a branch prediction engine to predict the outcome of a branch and provide a confidence of the prediction; and
    a dynamic optimizer to control:
        storing information about cache misses, wherein the information includes an instruction cache line address, branch target characteristics including a type of branch indicator, the confidence of the prediction, and a branch address;
        identifying common instruction cache misses;
        for an indirect branch, to insert, regardless of the confidence, a prefetch instruction from the prefetch engine to the instruction cache; and
        for a direct branch, to insert a prefetch instruction from the prefetch engine to the instruction cache is based upon whether the taken branch had a strong prediction or a weak prediction and the prefetch instruction is executed or not executed dependent upon the confidence of the prediction.

3. A computer system comprising:
    a memory control hub coupled to a memory; and
    a processor to manage instruction cache prefetching comprising:
    a prefetch engine; a branch prediction engine to predict the outcome of a branch and provide a confidence of the prediction; and
    a dynamic optimizer to control:
        storing information about cache misses, wherein the information includes an instruction cache line address, branch target characteristics characteristics including a type of branch indicator, the confidence of the prediction, and a branch address;
        identifying common instruction cache misses;
        for an indirect branch, inserting, regardless of the confidence, a prefetch instruction from the prefetch engine to the instruction cache; and
        for a direct branch, inserting the prefetch instruction from the prefetch engine to the instruction cache is based upon whether the taken branch had a strong prediction or a weak prediction and the prefetch instruction is executed or not executed dependent upon the confidence of the prediction.

4. A computer program product comprising:
    a non-transitory computer-readable medium comprising code for:
        storing information about instruction cache misses, wherein the information includes an instruction cache line address, branch target characteristics including a type of branch indicator, the confidence of the prediction, and a branch address;
        identifying common instruction cache misses; predicting the outcome of a branch and providing a confidence of the prediction; and
        for an indirect branch, inserting, regardless of the confidence, a prefetch instruction from a prefetch engine to the instruction cache; and
        for a direct branch, inserting the prefetch instruction from the prefetch engine to the instruction cache is based upon whether the taken branch had a strong prediction or a weak prediction and the prefetch instruction is executed or not executed dependent upon the confidence of the prediction.

5. The computer program product of claim 4, further comprising code for creating a table to store profiled information including at least an address of an instruction missed in the instruction cache.

* * * * *